United States Patent [19]

Pochieh

[11] Patent Number: 5,087,126
[45] Date of Patent: Feb. 11, 1992

[54] METHOD OF ESTIMATING COLORS FOR COLOR IMAGE CORRECTION

[75] Inventor: Hung Pochieh, Hino, Japan
[73] Assignee: Konica Corporation, Tokyo, Japan
[21] Appl. No.: 485,555
[22] Filed: Feb. 27, 1990
[30] Foreign Application Priority Data
Feb. 28, 1989 [JP] Japan .................................. 1-46830
[51] Int. Cl.⁵ ...................... G01J 3/46; G01B 27/46; H04N 11/20
[52] U.S. Cl. ..................... 356/402; 355/38; 358/11; 364/526
[58] Field of Search ............... 356/402–411; 364/526; 355/38, 77; 358/11

[56] References Cited
FOREIGN PATENT DOCUMENTS
63-162248 7/1988 Japan .
63-254864 10/1988 Japan .
63-254865 10/1988 Japan .

*Primary Examiner*—F. L. Evans
*Assistant Examiner*—K. P. Hantis
*Attorney, Agent, or Firm*—Finnegan, Henderson, Farabow, Garrett & Dunner

[57] ABSTRACT

In a method of estimating colors of this invention, a combination of fundamental colors (x y z ...), which corresponds to a target color in a colorimetric system, is calculated by using the following equation:

$$\begin{pmatrix} x \\ y \\ z \\ . \\ . \end{pmatrix} = \begin{pmatrix} x_1 & x_2 & \cdots & x_{n+1} \\ y_1 & y_2 & \cdots & y_{n+1} \\ z_1 & z_2 & \cdots & z_{n+1} \\ . & . & & . \\ . & . & & . \\ . & . & & . \end{pmatrix} \begin{pmatrix} x'_1 & x'_2 & \cdots & x'_{n+1} \\ y'_1 & y'_2 & \cdots & y'_{n+1} \\ z'_1 & z'_2 & \cdots & z'_{n+1} \\ . & . & & . \\ . & . & & . \\ 1 & 1 & & 1 \end{pmatrix}^{-1} \begin{pmatrix} x' \\ y' \\ z' \\ . \\ . \\ 1 \end{pmatrix}$$

where $(x_i', y_i', z_i', \ldots)$ (i=1 to (n+1)) are values of (n+1) vertexes of a division space, which surround the target value in the colorimetric system, $(x_i, y_i, z_i, \ldots)$ (where i=1 to (n+1)) are values of vertexes of a division space of a fundamental color coordinate system corresponding to the division space in the colorimetric system, and $(x', y', z', \ldots)$ is a value of the target color in the colorimetric system.

4 Claims, 10 Drawing Sheets

SPACE 1

SPACE 2

SPACE 1

SPACE 2

$S(b) : S(d) : S(e) = S(b') : S(d') : S(e')$

SPACE 1

SPACE 2

SPACE 1

SPACE 2

METHOD OF ESTIMATING COLORS FOR COLOR IMAGE CORRECTION

BACKGROUND OF THE INVENTION

Field of the Invention

The present invention relates to a method of estimating colors for color image correction, which is suitable for the formation of an LUT (look-up table) in a color correcting apparatus of, e.g., a video printer or a digital color copying machine.

When hard copy of a TV image is to be produced by using, e.g., a color printer or a digital color copying machine, since each machine has its own color system, a color image correcting apparatus is used to match original colors with reproduced colors.

As is known, a color masking apparatus, for example, as one of color image correcting apparatuses is an apparatus for reproducing proper colors by canceling secondary absorbing components of a color material such as a toner or an ink.

Of TV images, color images are formed by a color addition method in which an RGB coordinate system of phosphors is used as its fundamental colorimetric system. In contrast to this, a color subtraction method is used to form color images on a photographic printing paper or the like. This method employs, e.g., a YMC fundamental color system. In such a case, conversion (color correction) of image data is performed between these fundamental color systems.

For example, as shown in FIG. 1, three primary color data of red R, green G, and blue B are converted into image data of yellow Y, magenta M, and cyan C by a color masking apparatus 10. These Y, M, C image data are supplied to a color printer 100.

If the color characteristics of a printer or the like can be accurately obtained, a combination of fundamental colors (e.g., Y, M, and C) which represents a target color can be obtained, thereby improving the color reproducibility.

A method of obtaining a combination of fundamental colors which represents a certain target color is disclosed in, e.g., Japanese Unexamined Patent Publication (Kokai) No. 63-254864. For the sake of a simple description, two fundamental colors (e.g., Y and M) are used.

FIG. 2 shows a YM coordinate system. Color patches are formed by supplying Y and M image data corresponding to the lattice points (5×5=25) of the YM coordinate system to a color printer.

Actual colors are measured from the color patch. The measurement values are then converted into values based on an L*u*v* colorimetric system by using a conversion formula. FIG. 3 shows a graphic pattern formed by plotting the converted values based on the L*u*v* colorimetric system. Vertices B, C, G, and F of a square in FIG. 2 respectively correspond to points B', C', G', and F' in FIG. 3.

A target value T' corresponding to an output color to be obtained is set in the L*u*v* colorimetric system. In this case, if the target value T' is set within an area defined by lattice points a' to d' as shown in FIG. 3, a combination of Y and M (target value T) in the YM coordinate system is estimated to be located in an area defined by lattice points a to d, as shown in FIG. 2.

The position of the target value T in the area defined by the lattice points a to d is obtained by performing convergence processing while mapping the colorimetric system in FIG. 3 on the coordinate system in FIG. 2.

Convergence processing is performed in this manner for the following reason. Although conversion from the coordinate system in FIG. 2 into the colorimetric system in FIG. 3 is known, their inversion is very complicated, and any good conversion formula has not been known yet.

A specific one of areas defined by the 25 lattice points (see FIG. 3), in which the target value T' is present, is obtained. If the target value T' is present in an area S'O as shown in FIG. 5, it is estimated that the value is present in an area SO corresponding to the area S'O as shown in FIG. 4.

The estimated area SO is divided into four equal areas S1 to S4. Five division points e to i are calculated from weighting averages of surrounding lattice points. These division points e to i are then converted into values in the L*u*v* colorimetric system by using a conversion formula for the system. The converted values are plotted on the colorimetric system in FIG. 5, and a specific one of four areas S1' to S4' defined by plotted division points e' to i', in which the target value T' is present, is obtained. If the target value T' is present in the area S2' as shown in FIG. 5, it is estimated that the value is present in the area S2 corresponding to the area S2', as shown in FIG. 4.

The estimated area S2 is then divided into four equal areas S5 to S8. Five division points j to n are calculated from weighting averages of surrounding lattice points which have already been obtained. These division points j to n are then converted into values in the L*u*v* colorimetric system by using a conversion formula for the system. The converted values are plotted on the colorimetric system in FIG. 5, and a specific one of four areas S5' to S8' defined by plotted division points j' to n', in which the target value T' is present, is obtained. If the target value T' is present in the area S8' as shown in FIG. 5, it is estimated that the value is present in the area S8 corresponding to the area S8', as shown in FIG. 4.

The estimated area S8 is divided into four equal areas S9 to S12. Five division points o to s are calculated from weighting averages of surrounding lattice points which have already been obtained. These division points o to s are then converted into values in the L*u*v* colorimetric system by using a conversion formula for the system. The converted values are plotted on the colorimetric system in FIG. 5, and a specific one of four areas S9' to S12' defined by plotted division points o' to s', in which the target value T is present, is obtained. If the target value T is present in the area S10' as shown in FIG. 5, it is estimated that the value is present in the area S10 corresponding to the area S10', as shown in FIG. 4.

By repeatedly dividing areas in such a manner, matrices are gradually reduced in size and finally converge. By calculating an averge of four lattice points or division points of the area which converges, the target value T, i.e., a combination of fundamental colors representing an output color to be obtained can be obtained.

The above-described estimation operations are performed with respect to each target value T' in order to obtain a corresponding target value T.

The above-described color masking apparatus 10 may be designed such that, for example, a table is formed in advance on the basis of the target values T estimated in this manner, and a given target value T is referred to in accordance with input image data. In this case, R, G, and B image data are made to correspond to Y, M, and C image data through corresponding values of the L*u*v* colorimetric system.

In the conventional method of obtaining a target value T in this manner, since convergence processing is performed by repeatedly dividing areas, a long processing time is required.

SUMMARY OF THE INVENTION

It is an object of the present invention to provide a method of estimating colors, in which when conversion of colorimetric systems is to be performed for color image correction, a combination of fundamental colors, which corresponds to a target color, is obtained in a short processing time without using convergence processing.

According to the present invention, when a specific area in which a target value T' of a given colorimetric system is present is obtained, a combination of fundamental colors T, which corresponds to the target value T', is calculated on the basis of the values of the colorimetric system surrounding the target value T' and a combination of fundamental colors corresponding to the values of the colorimetric system. In this method, convergence processing, which is performed by repeatedly dividing areas, need not be performed.

DETAILED DESCRIPTION OF THE PREFERRED EMBODIMENTS

An embodiment of the present invention will be described below with reference to the accompanying drawings.

The principle of this embodiment will be described first.

A simplest division space, as a unit, obtained by dividing an n-dimensional (n is an integer of 2 or more) space is a division space having (n+1) Vertices. For example, a triangle is a division space for a two-dimensional space; and a triangular pyramid, for a three-dimensional space.

Figure 1:
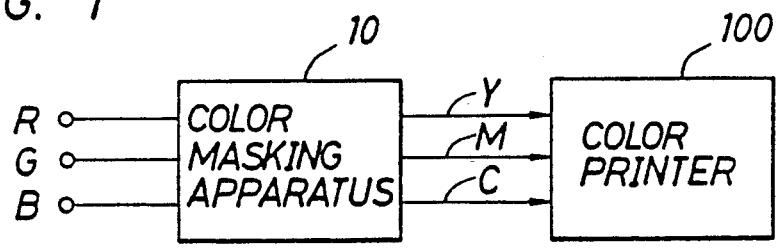
FIG. 1 is a block diagram showing a color image recording system including a color masking apparatus to which a method of estimating colors according to the present invention is applied.
Figure 2:
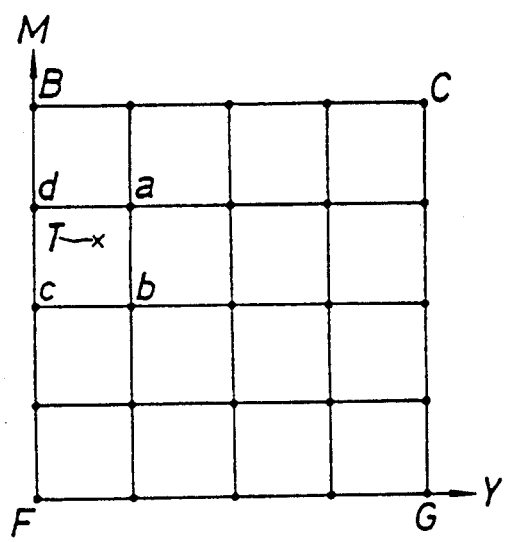
FIGS. 2 to 5 are views for explaining a conventional method of estimating colors.
Figure 3:
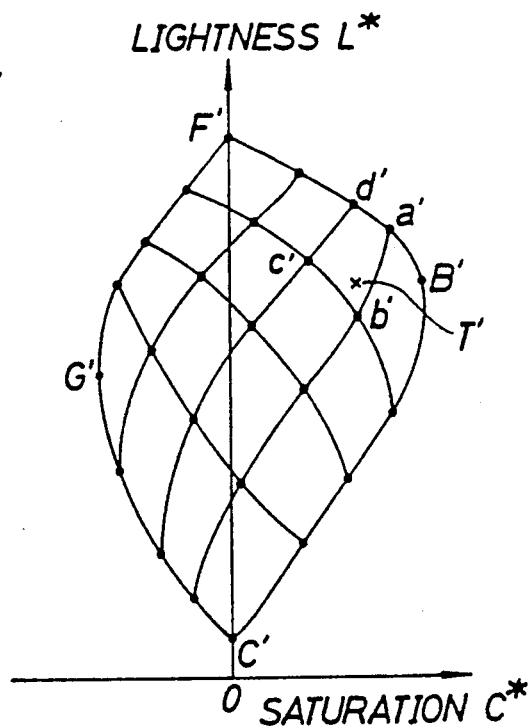
Figure 4:
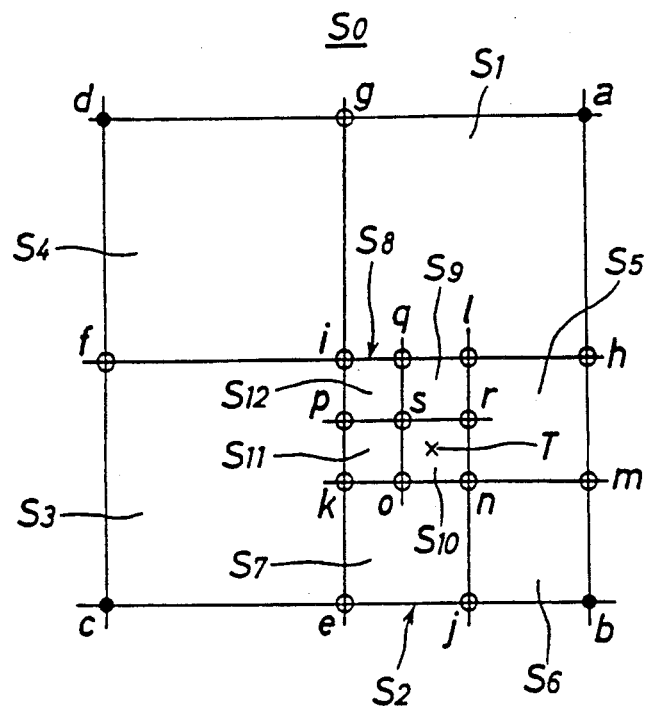
Figure 5:
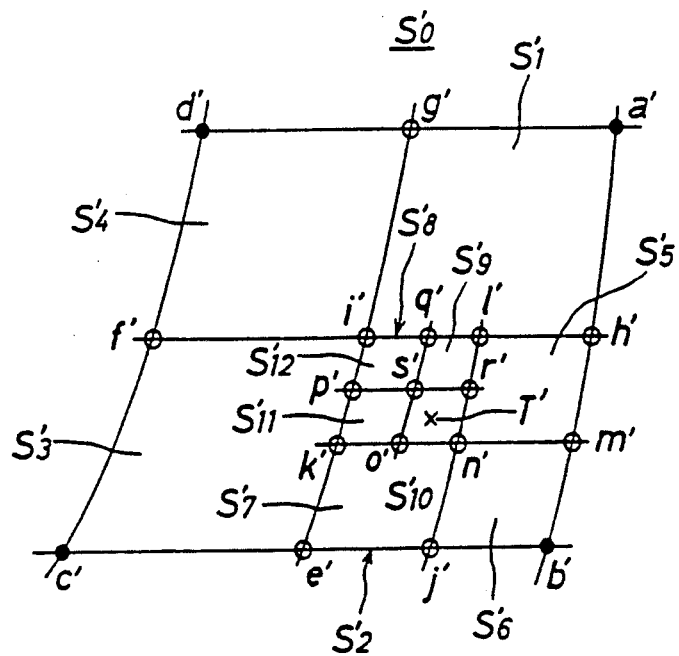
Figure 6A:
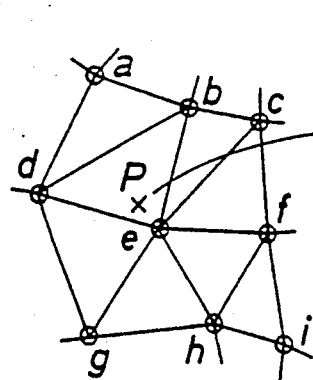
FIGS. 6 and 7 are views for explaining the principle of the present invention.
Figure 6B:
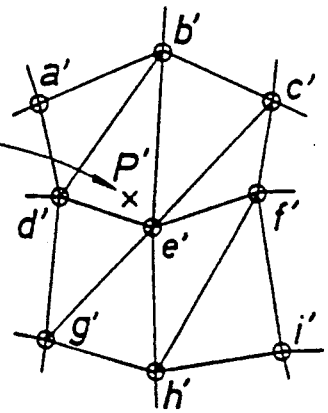

Two-dimensional spaces 1 and 2 will be exemplified, as shown in FIG. 6. In this case, the spaces 1 and 2 are respectively divided into a plurality of triangles obtained by connecting points a to i and points a' to i'. For example, a division space (triangle) $\triangle bde$ of the space 1 corresponds to a division space (triangle) $\triangle b'd'e'$ of the space 2.

Assume that spaces corresponding to each other in this manner correspond to each other in a one-to-one correspondence, and a point P given in the space 1 corresponds to a point P' in the space 2.

If the positions of three points b, d, and e surrounding the point P in the division space $\triangle bde$ and those of three points b', d', and e' surrounding the point P' in the division space $\triangle b'd'e'$ are respectively represented by $(x_i, y_i)$ and $(x_i', y_i')$ (i=1, 2, 3), and the positions of the points P and P' are respectively represented by (x,y) and (x',y'), the position of the point P' can be obtained by the following equation (1):

$$\binom{x}{y} = \binom{x_1 \, x_2 \, x_3}{y_1 \, y_2 \, y_3} \begin{pmatrix} x'_1 & x'_2 & x'_3 \\ y'_1 & y'_2 & y'_3 \\ 1 & 1 & 1 \end{pmatrix}^{-1} \begin{pmatrix} x' \\ y' \\ 1 \end{pmatrix} \quad (1)$$

Figure 7A:
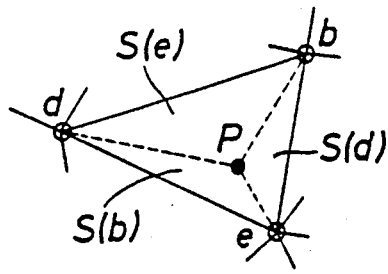
Figure 7B:
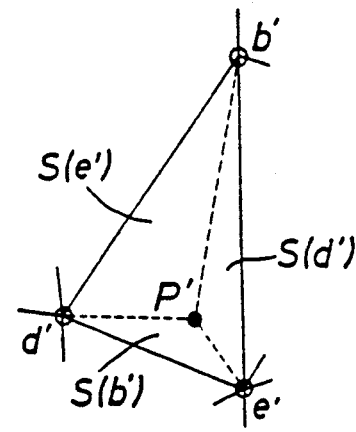

The position of the point P' to be obtained can be obtained from a weighting average of an area S, as shown in FIG. 7:

$$S(b):S(d):S(e) = S(b'):S(d'):S(e')$$

Note that a division space to which a given point P belongs can be specified by checking which side of a boundary line (or a boundary plane) of each division space the point P is located.

A combination of fundamental colors, which represents a given target color, is obtained on the basis of the above-described principle as follows. For the sake of a simple description, two fundamental colors (e.g., Y and M) will be exemplified.

Figure 8:
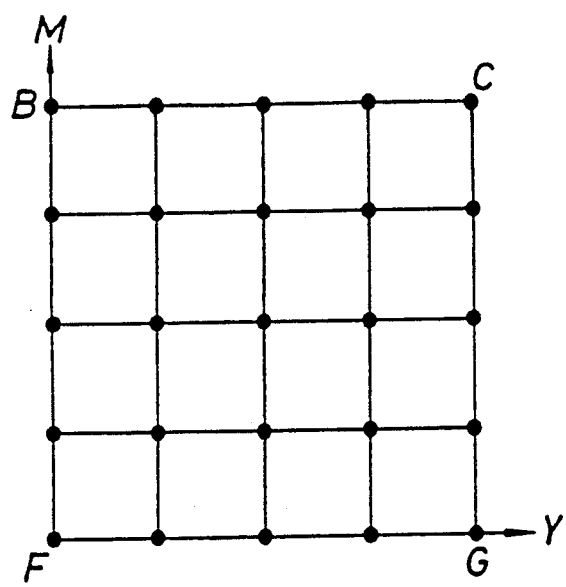
FIG. 8 is a view showing a YM coordinate system as a fundamental color coordinate system.

FIG. 8 shows a YM coordinate system. Color patches are formed by supplying Y and M image data corresponding to the lattice points (5×5=25) of the YM coordinate system to a color reproducing apparatus to be used for color estimation, e.g., a color printer.

Figure 9:
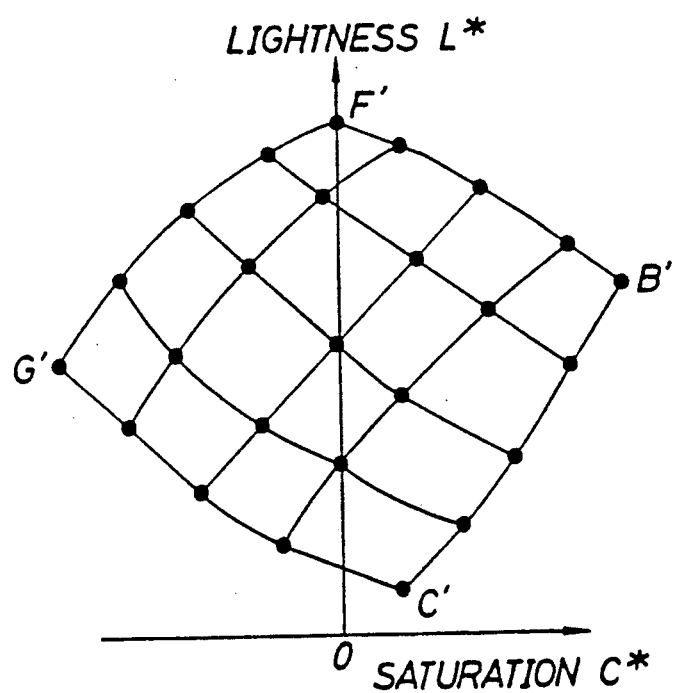
FIG. 9 is a view showing an L*u*v* colorimetric system converted from the YM coordinate system in FIG. 8.

Actual colors are then measured from the color patches. The measured values are converted into values of an L*u*v* colorimetric system by using a conversion formula. FIG. 9 shows a graphic pattern obtained by plotting the converted values of the L*u*v* colorimetric system for each lattice point. Vertices B, C, G, and F of a square in FIG. 8 respectively correspond to points B', C', G', and F' in FIG. 9.

Figure 10:
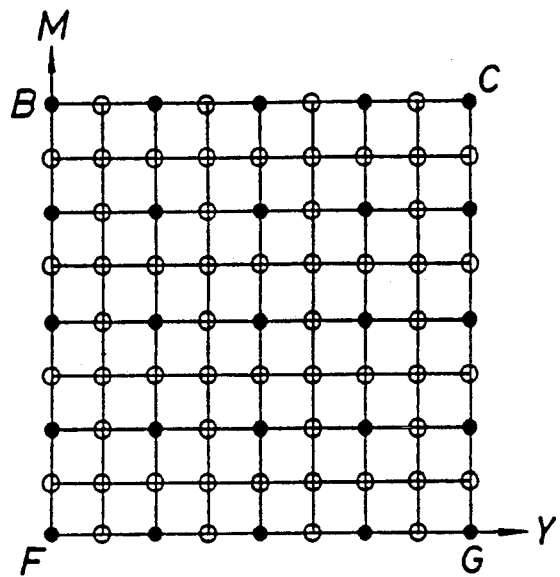
FIG. 10 is a view showing a YM coordinate system formed by performing interpolation processing with respect to the YM coordinate system in FIG. 8.
Figure 11:
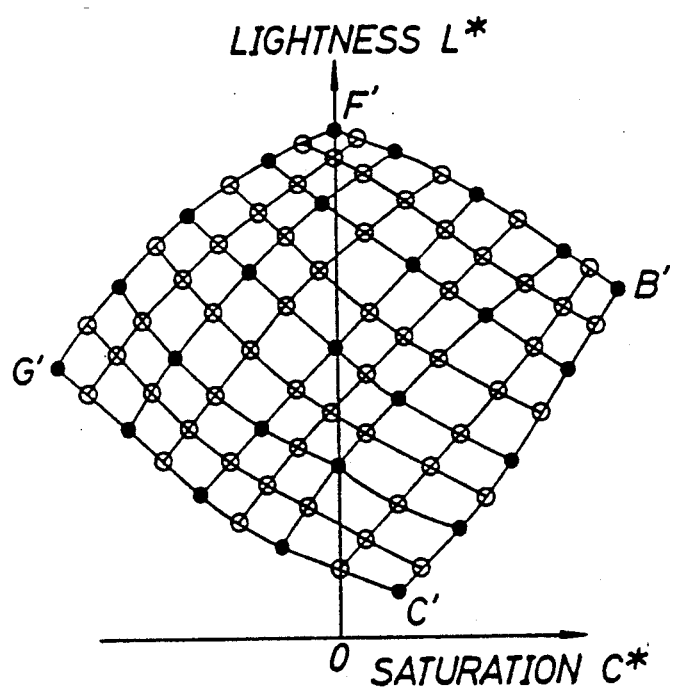
FIG. 11 is a view showing an L*u*v* colorimetric system converted from the YM coordinate system in FIG. 10.

Lattice points are interpolated in each system by interpolation processing. As a result, for example, the number of lattice points is increased to $9 \times 9 = 81$. After the interpolation processing, the YM coordinate system and the L*u*v* colorimetric system are respectively converted into systems shown in FIGS. 10 and 11. In FIGS. 10 and 11, white lattice points represent the interpolated points.

Figure 12:
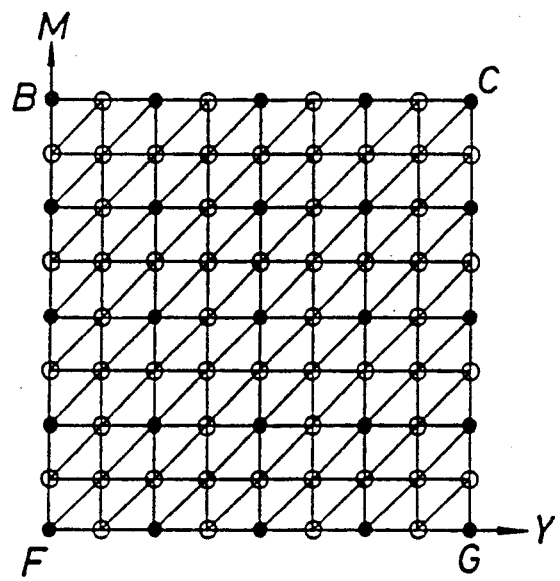
FIG. 12 is a view showing a coordinate system obtained by dividing the YM coordinate system in FIG. 10.
Figure 13:
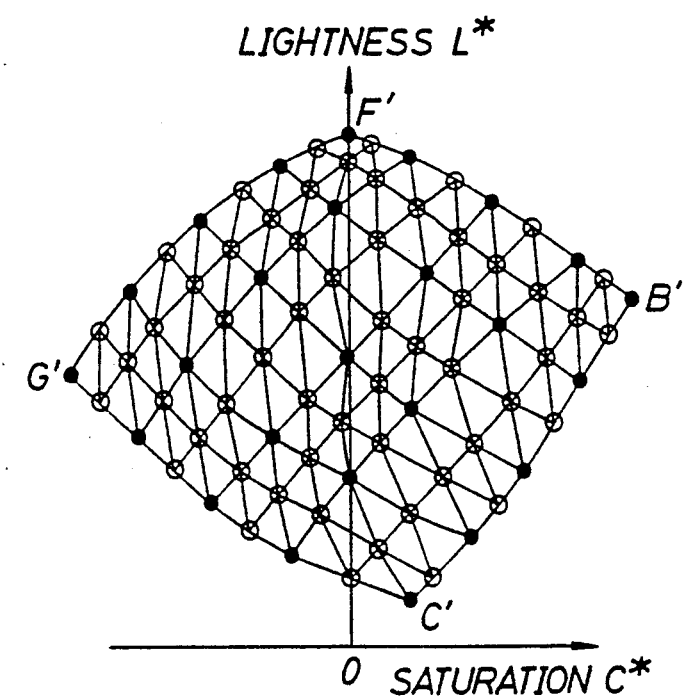
FIG. 13 is a view showing an L*u*v* colorimetric system converted from the YM coordinate system in FIG. 12.

The spaces of the YM coordinate system and the L*u*v* colorimetric system are divided into triangles, as shown in FIGS. 12 and 13. As a result, the spaces of each system are divided into $8^2 \times 2 = 128$.

Figure 15:
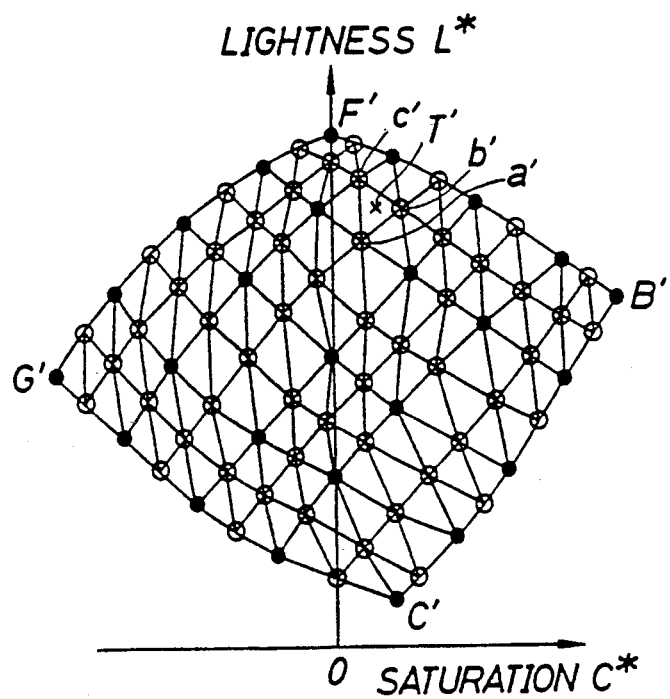
FIG. 15 is a view showing an L*u*v* colorimetric system converted from the YM coordinate system in FIG. 14.

As shown in FIG. 15, a value corresponding to an output color (target color) to be obtained, i.e., a target value T' is set in the L*u*v* colorimetric system. It is then checked a specific one of the divided triangles in which the target value T' is located. As described above, the specific triangle can be obtained by checking a specific side of each triangle on which the target value T' is located.

Figure 14:
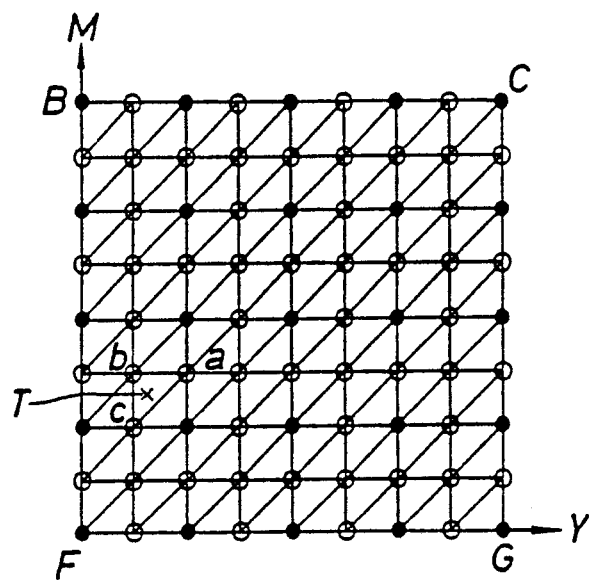
FIG. 14 is a view showing a target color in the YM coordinate system in FIG. 12.

If the target value T' is located in a triangle defined by lattice points a', b', and c' as shown in FIG. 15, a combination of Y and M (target value T) in the YM coordinate system is present in a triangle defined by lattice points a, b, and c, as shown in FIG. 14.

With the substitution of the target value T' and the coordinates of the vertices (three points) of each of the triangles of the L*u*v* colorimetric system and the YM coordinate system, in which the target values T' and T are respectively present, into the equation (1), the target value T, i.e., the combination of fundamental colors, which represents the output color to be obtained, can be obtained.

Subsequently, a triangle is specified with respect to each given target value T', and a corresponding target value T is obtained by performing arithmetic operation based on the equation (1).

Figure 16:
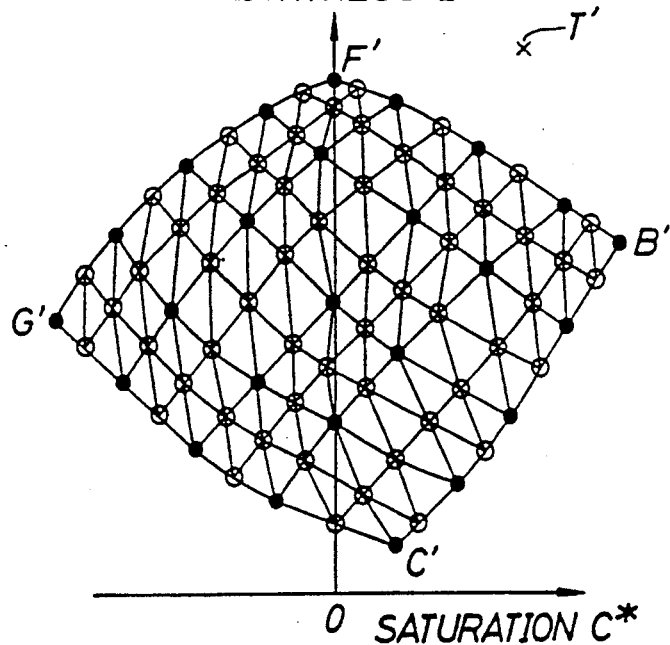
FIG. 16 is a view wherein a target value is located outside an L*u*v* colorimetric system.

If a given target value T' is not present in any triangle of the L*u*v* colorimetric system and is located outside a color reproduction range as shown in FIG. 16, this target value T' must be changed to fall within the color reproduction range.

Figure 17:
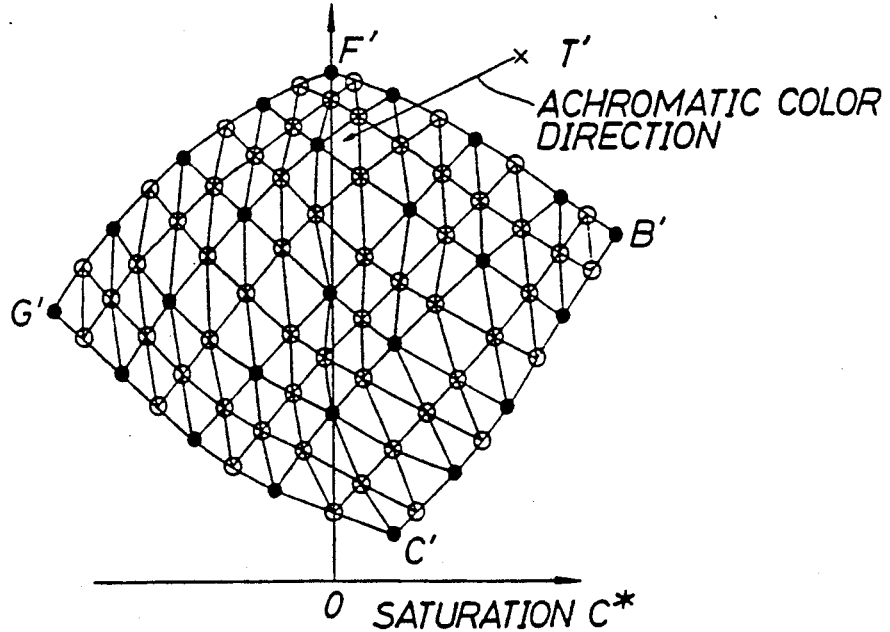
FIG. 17 is a view, showing an L*u*v* colorimetric system, for explaining arithmetic processing when a target value is located outside the colorimetric system.
Figure 18:
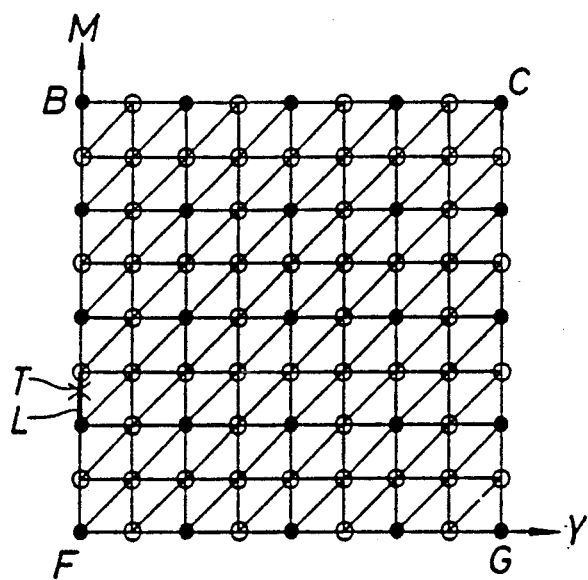
FIG. 18 is a view, showing a YM coordinate system and an L*u*v* colorimetric system, for explaining another arithmetic processing when a target value is located outside the colorimetric system.
Figure 19:
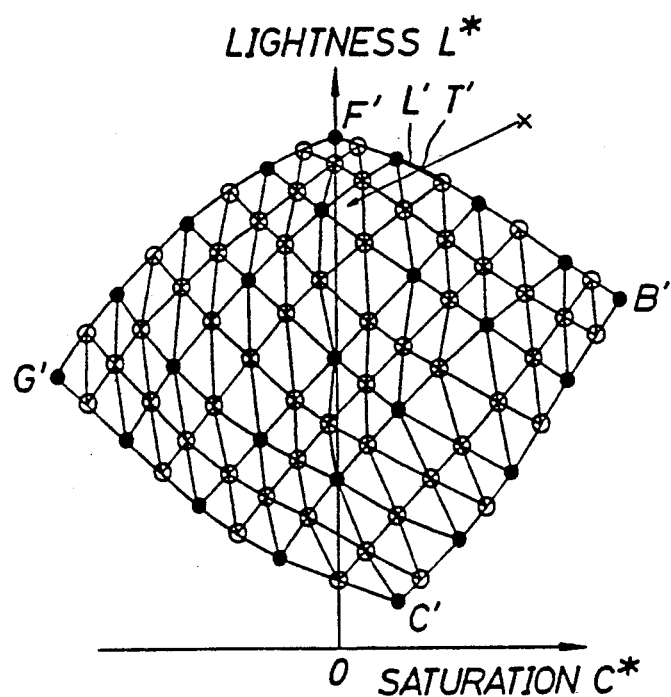

In this case, the target value T' is changed in the achromatic color direction as shown in FIG. 17, and the coordinates of the intersection of a line extending in the achromatic color direction and the boundary of the color reproduction range are set to be the target value T'. The target value T' and a line segment L' in which the target value T' is included are calculated, and a line segment L corresponding to the line segment L' in the YM coordinate system is calculated. A target value T is calculated by the equation (1) on the basis of these calculation results.

Note that the target value T' need not necessarily changed to the boundary but may be changed to fall within the color reproduction range.

In the above embodiment, two fundamental colors (Y and M) have been exemplified for the sake of a simple description. However, even if three fundamental colors (Y, M, and C) are used, a target value T (Y,M,C) can be obtained in the same manner as described above. In this case, however, each space is divided into triangular pyramids, and a specific one of the triangular pyramids of an L*u*v* colorimetric system in which a given target value T' is present is checked. Thereafter, a corresponding triangular pyramid of a corresponding YMC coordinate system is determined.

Assuming, for example, that the four vertexes of a triangular pyramid of the YMC coordinate system in which a target value T (Y,M,C) is present are given as follows:

$(Y_1, M_1, C_1)$
$(Y_2, M_2, C_2)$
$(Y_3, M_3, C_3)$
$(Y_4, M_4, C_4)$ and that the four vertexes of a triangular pyramid of the L*u*v* colorimetric system in which a target value T' (L,u,v) of the L*u*v* colorimetric system are given as follows:

$(L_1, u_1, v_1)$
$(L_2, u_2, v_2)$
$(L_3, u_3, v_3)$
$(L_4, u_4, v_4)$ then, the target value T can be obtained by the following matrix:

$$\begin{pmatrix} Y \\ M \\ C \end{pmatrix} = \begin{pmatrix} Y_1 & Y_2 & Y_3 & Y_4 \\ M_1 & M_2 & M_3 & M_4 \\ C_1 & C_2 & C_3 & C_4 \end{pmatrix} \begin{pmatrix} L_1 & L_2 & L_3 & L_4 \\ u_1 & u_2 & u_3 & u_4 \\ v_1 & v_2 & v_3 & v_4 \\ 1 & 1 & 1 & 1 \end{pmatrix}^{-1} \begin{pmatrix} L \\ u \\ v \\ 1 \end{pmatrix}$$

Figure 20A:
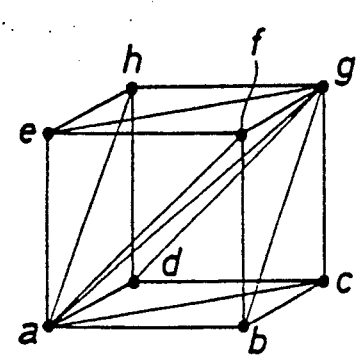
FIGS. 20 and 21 are views each showing a state wherein a space is divided into triangular pyramids.
Figure 20B:
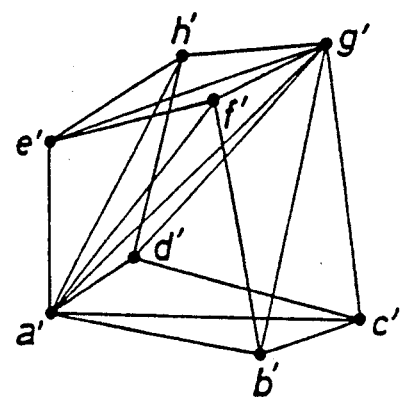
Figure 21A:
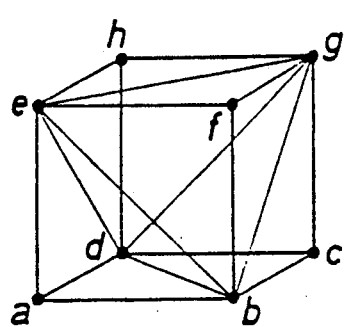
Figure 21B:
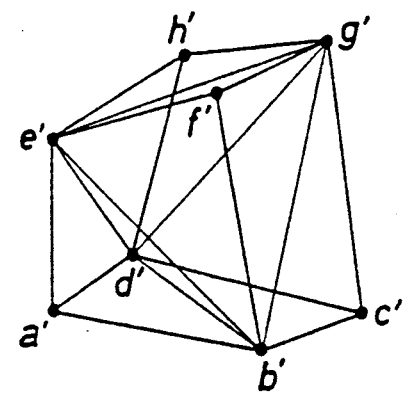

Note that a space (hexahedron) may be divided into triangular pyramids as shown in FIG. 20 or FIG. 21. In FIGS. 20 and 21, points a to h in a space 1 respectively correspond to points a' to h' in a space 2.

For example, Japanese Patent Application Nos. 63-162248 and 63-254865 disclose color masking apparatuses which are designed such that color correction data (target values T) obtained by the above-described method are stored, and the stored color correction data are referred to in accordance with input image data.

According to the present invention, therefore, a target value T is obtained without convergence processing, and the processing time can be greatly shortened. For example, it was found upon actual measurement that the processing time was reduced to about 1/5 that of the conventional method.

In the above-described embodiment, only two-dimensional and three-dimensional spaces have been exemplified. However, the present invention can be applied to spaces of other dimensions. In processing for an n-dimensional space, if the positions of (n+1) vertexes surrounding a given point P (x,y,z, ...) are represented by $(x_i, y_i, z_i, ...)$ and the positions of (n+1) Vertices surrounding a point P' to be obtained are represented by $(x_i', y_i', z_i', ...)$, the position of the point P' can be generally obtained by the following equation similar to equation (1):

$$\begin{pmatrix} x \\ y \\ z \\ \vdots \end{pmatrix} =$$

-continued $$\begin{pmatrix} x_1 & x_2 & \cdots & x_{n+1} \\ y_1 & y_2 & \cdots & y_{n+1} \\ z_1 & z_2 & \cdots & z_{n+1} \\ \cdot & \cdot & & \cdot \\ \cdot & \cdot & & \cdot \\ \cdot & \cdot & & \cdot \end{pmatrix} \begin{pmatrix} x'_1 & x'_2 & \cdots & x'_{n+1} \\ y'_1 & y'_2 & \cdots & y'_{n+1} \\ z'_1 & z'_2 & \cdots & z'_{n+1} \\ \cdot & \cdot & & \cdot \\ \cdot & \cdot & & \cdot \\ 1 & 1 & & 1 \end{pmatrix}^{-1} \begin{pmatrix} x \\ y \\ z \\ \cdot \\ \cdot \\ 1 \end{pmatrix}$$

In the above embodiment, combinations of Y, M, and C and Y, M, C, and K have been exemplified as fundamental colors. However, R, G, and B can be used in the same manner as described above, and hence fundamental colors can be arbitrarily selected.

Furthermore, in the above embodiment, an L*u*v* coordinate system is used as a colorimetric system. In place of the L*u*v* coordinate system, an L*a*b* coordinate system or similar one may be used in the present invention.

As has been described above, according to the present invention, when a specific area in which a target value of a colorimetric system is present is obtained, a combination of fundamental colors, which corresponds to the target value can be calculated by using values of the colorimetric system which surround the target value and a combination of fundamental colors corresponding to the values of the colorimetric system. Since convergence processing which is performed by repeatedly dividing areas as in the conventional method need not be performed, the processing time can be greatly shortened.

What is claimed is:

1. A method of estimating colors, comprising the steps of:
   performing colorimetry of a plurality of colors obtained by combining n fundamental colors, where n is an integer of not less than 2;
   converting values obtained by the colorimetry into values in a predetermined colorimetric system; and
   calculating a combination of fundamental colors, which corresponds to a target color in the colorimetric system, by using a combination of n+1 values in the colorimetric system which surround the target value in the colorimetric system and fundamental colors corresponding to the n+1 values in the colorimetric system.

2. A method of estimating colors, comprising the steps of:
   performing colorimetry of a plurality of colors obtained by combining n fundamental colors, where n is an integer not less than 2;
   converting values obtained by colorimetry into values of a predetermined colorimetric system; and
   calculating a combination of fundamental colors, which corresponds to a target color in the colorimetric system, by using the converted values in the colorimetric system, wherein the combination of fundamental colors (x,y,z,...), which corresponds to the target color in the colorimetric system, is calculated by using the following equation:

$$\begin{pmatrix} x \\ y \\ z \\ \cdot \\ \cdot \\ \cdot \end{pmatrix} = \begin{pmatrix} x1 & x2 & \cdots & xn+1 \\ y1 & y2 & \cdots & yn+1 \\ z1 & z2 & \cdots & zn+1 \\ \cdot & \cdot & & \cdot \\ \cdot & \cdot & & \cdot \\ \cdot & \cdot & & \cdot \end{pmatrix} \begin{pmatrix} x'1 & x'2 & \cdots & x'n+1 \\ y'1 & y'2 & \cdots & y'n+1 \\ z'1 & z'2 & \cdots & z'n+1 \\ \cdot & \cdot & & \cdot \\ \cdot & \cdot & & \cdot \\ 1 & 1 & & 1 \end{pmatrix}^{-1} \begin{pmatrix} x' \\ y' \\ z' \\ \cdot \\ \cdot \\ 1 \end{pmatrix}$$

where xi',yi',zi', ... and (i=1 to (n+1)) are values of n+1 vertices of a division space, which surround the target value in the colorimetric system; xi,yi,zi, ... and (i=1 to (n+1)) are values of vertices of a division space of a fundamental color coordinate system corresponding to the division space in the colorimetric system; and x',y',z', ... is a value of the target color in the colorimetric system.

3. A method according to claim 2, wherein values of the colorimetric system include values which are added by interpolation processing.

4. A method according to claim 2, wherein when a target color of the colorimetric system is located outside a range of a colorimetric system formed on the basis of the plurality of colors obtained by combining the n fundamental colors, a value of the target color is changed in an achromatic color direction, and a value of an intersection of a line extending in the achromatic color direction and a boundary of the range or a value located within the range is used as a value of the target value.

* * * * *